US007418508B2

(12) United States Patent
Haller et al.

(10) Patent No.: US 7,418,508 B2
(45) Date of Patent: Aug. 26, 2008

(54) SYSTEM AND METHOD TO FACILITATE XML ENABLED IMS TRANSACTIONS BETWEEN A REMOTE CLIENT AND AN IMS APPLICATION PROGRAM

(75) Inventors: Daniel M. Haller, San Jose, CA (US); Shyh-Mei F. Ho, Cupertino, CA (US); Gerald D. Hughes, Morgan Hill, CA (US); Jenny C. Hung, Fremont, CA (US); Bill T. Huynh, Oakland, CA (US); Steve T. Kuo, San Jose, CA (US)

(73) Assignee: International Machines Corporation, Armonk, NY (US)

( * ) Notice: Subject to any disclaimer, the term of this patent is extended or adjusted under 35 U.S.C. 154(b) by 866 days.

(21) Appl. No.: 10/764,722

(22) Filed: Jan. 26, 2004

(65) Prior Publication Data

US 2005/0165936 A1 Jul. 28, 2005

(51) Int. Cl.
*G06F 15/16* (2006.01)
*G06F 15/173* (2006.01)
*G06F 15/177* (2006.01)

(52) U.S. Cl. ............... 709/228; 709/203; 709/246; 719/310

(58) Field of Classification Search .............. 709/228, 709/200–203, 217–227, 246; 719/310
See application file for complete search history.

(56) References Cited

U.S. PATENT DOCUMENTS 4,740,783 A 4/1988 Lawrence et al.

| | | |
|---|---|---|
| 5,761,656 A | 6/1998 | Ben-Shachar |
| 5,781,739 A | 7/1998 | Bach et al. |
| 5,870,549 A | 2/1999 | Bobo, II |
| 5,899,975 A | 5/1999 | Nielsen |
| 5,960,200 A | 9/1999 | Eager et al. |
| 6,128,622 A | 10/2000 | Bach et al. |
| 6,141,660 A | 10/2000 | Bach et al. |

(Continued)

FOREIGN PATENT DOCUMENTS

| JP | 2001-273177 A | 5/2001 |
| WO | WO 01/67290 A2 | 9/2001 |

OTHER PUBLICATIONS

Cronje, Johan, "Absa Uses VGR to Ensure Online Availability", www-306.imb.com/software/data/ims/quarterly/Winter2000/winter.htm, Winter 2000, printed Feb. 10, 2005, 5 pages.

(Continued)

*Primary Examiner*—Haresh N Patel
(74) *Attorney, Agent, or Firm*—Kunzler & McKenzie

(57) ABSTRACT

A system for facilitating XML enable IMS transactions includes a generic XML processor inside an IMS connect program to facilitate any TCP/IP clients, including WebSphere and non-WebSphere, to send and receive XML documents to and from existing IMS transaction business logic. Translations between XML documents and IMS transaction message data structures occur within the IMS connect program under an XML task to parse and transform XML requests and responses. Further, the generic XML processor within the IMS connect program can provide data translation for both non-formatted and formatted IMS transactional messages in XML.

3 Claims, 3 Drawing Sheets

U.S. PATENT DOCUMENTS

| | | |
|---|---|---|
| 6,212,550 B1 | 4/2001 | Segur |
| 6,243,737 B1 | 6/2001 | Flanagan et al. |
| 6,250,309 B1 | 6/2001 | Krichen et al. |
| 6,253,200 B1 | 6/2001 | Smedley et al. |
| 6,256,676 B1 | 7/2001 | Taylor et al. |
| 6,259,447 B1 | 7/2001 | Kanetake et al. |
| 6,289,382 B1 | 9/2001 | Bowman-Amuah |
| 6,446,110 B1 | 9/2002 | Lection et al. |
| 6,453,343 B1 | 9/2002 | Housel, III et al. |
| 6,507,856 B1 | 1/2003 | Chen et al. |
| 6,507,857 B1 | 1/2003 | Yalcinalp |
| 6,510,466 B1 | 1/2003 | Cox et al. |
| 6,519,617 B1 | 2/2003 | Wanderski et al. |
| 6,535,896 B2 | 3/2003 | Britton et al. |
| 6,560,639 B1 | 5/2003 | Dan et al. |
| 6,589,291 B1 | 7/2003 | Boag et al. |
| 6,591,272 B1 | 7/2003 | Williams |
| 6,601,071 B1 | 7/2003 | Bowker et al. |
| 6,606,642 B2 | 8/2003 | Ambler et al. |
| 6,613,098 B1 | 9/2003 | Sorge et al. |
| 6,668,354 B1 | 12/2003 | Chen et al. |
| 6,687,873 B1 | 2/2004 | Ballantyne et al. |
| 6,728,685 B1 | 4/2004 | Ahluwalia |
| 6,753,889 B1 | 6/2004 | Najmi |
| 6,772,206 B1 | 8/2004 | Lowry et al. |
| 6,775,680 B2 | 8/2004 | Ehrman et al. |
| 6,799,299 B1 | 9/2004 | Li et al. |
| 6,889,360 B1 | 5/2005 | Ho et al. |
| 6,901,403 B1 | 5/2005 | Bata et al. |
| 6,901,430 B1 | 5/2005 | Smith |
| 6,904,598 B2 | 6/2005 | Abileah et al. |
| 6,907,564 B1 | 6/2005 | Burchhardt et al. |
| 6,909,903 B2 | 6/2005 | Wang |
| 6,912,719 B2 | 6/2005 | Elderon et al. |
| 6,915,523 B2 | 7/2005 | Dong et al. |
| 6,948,117 B2 | 9/2005 | Van Eaton et al. |
| 6,948,174 B2 | 9/2005 | Chiang et al. |
| 6,952,717 B1 | 10/2005 | Monchilovich et al. |
| 6,964,053 B2 | 11/2005 | Ho et al. |
| 6,971,096 B1 | 11/2005 | Ankireddipally et al. |
| 6,980,963 B1 | 12/2005 | Hanzek |
| 7,000,238 B2 | 2/2006 | Nadler et al. |
| 7,013,306 B1 | 3/2006 | Turba et al. |
| 7,024,413 B2 | 4/2006 | Binding et al. |
| 7,043,687 B2 | 5/2006 | Knauss et al. |
| 7,051,032 B2 | 5/2006 | Chu-Carroll et al. |
| 7,054,901 B2 | 5/2006 | Shafer |
| 7,069,291 B2 | 6/2006 | Graves et al. |
| 7,080,092 B2 | 7/2006 | Upton |
| 7,111,011 B2 | 9/2006 | Kobayashi et al. |
| 7,120,645 B2 | 10/2006 | Manikutty et al. |
| 7,120,702 B2 | 10/2006 | Huang et al. |
| 7,124,299 B2 | 10/2006 | Dick et al. |
| 7,130,893 B2 | 10/2006 | Chiang et al. |
| 7,134,075 B2 | 11/2006 | Hind et al. |
| 7,143,190 B2 | 11/2006 | Christensen et al. |
| 7,152,205 B2 | 12/2006 | Day et al. |
| 7,266,582 B2 | 9/2007 | Stelting |
| 7,296,226 B2 | 11/2007 | Junkermann |
| 2001/0014900 A1 | 8/2001 | Brauer et al. |
| 2001/0047311 A1 | 11/2001 | Singh |
| 2002/0010716 A1 | 1/2002 | McCartney et al. |
| 2002/0035583 A1 | 3/2002 | Price et al. |
| 2002/0038335 A1* | 3/2002 | Dong et al. ............... 709/203 |
| 2002/0038336 A1* | 3/2002 | Abileah et al. ............ 709/203 |
| 2002/0042849 A1 | 4/2002 | Ho et al. |
| 2002/0046294 A1* | 4/2002 | Brodsky et al. ............ 709/246 |
| 2002/0049815 A1 | 4/2002 | Dattatri |
| 2002/0078255 A1 | 6/2002 | Narayan |
| 2002/0099735 A1 | 7/2002 | Schroeder et al. |
| 2002/0116454 A1 | 8/2002 | Dyla et al. |
| 2002/0178290 A1 | 11/2002 | Coulthard et al. |
| 2002/0178299 A1 | 11/2002 | Teubner |
| 2002/0188688 A1 | 12/2002 | Bice et al. |
| 2003/0004746 A1 | 1/2003 | Kheirolomoom et al. |
| 2003/0065623 A1 | 4/2003 | Corneil et al. |
| 2003/0074217 A1 | 4/2003 | Beisiegel et al. |
| 2003/0081002 A1 | 5/2003 | De Vorchik et al. |
| 2003/0093403 A1 | 5/2003 | Upton |
| 2003/0093436 A1 | 5/2003 | Brown et al. |
| 2003/0093468 A1 | 5/2003 | Gordon et al. |
| 2003/0093500 A1 | 5/2003 | Khodabakchian et al. |
| 2003/0120730 A1 | 6/2003 | Kuno et al. |
| 2003/0159111 A1 | 8/2003 | Fry |
| 2003/0204460 A1 | 10/2003 | Robinson et al. |
| 2004/0006739 A1 | 1/2004 | Mulligan |
| 2004/0024820 A1 | 2/2004 | Ozzie et al. |
| 2004/0054969 A1 | 3/2004 | Chiang et al. |
| 2004/0054970 A1 | 3/2004 | Chiang et al. |
| 2004/0103370 A1 | 5/2004 | Chiang et al. |
| 2004/0111464 A1* | 6/2004 | Ho et al. .................... 709/203 |
| 2004/0221292 A1* | 11/2004 | Chiang et al. ............. 719/310 |
| 2004/0230987 A1 | 11/2004 | Snover et al. |
| 2005/0050228 A1 | 3/2005 | Perham et al. |
| 2005/0091639 A1 | 4/2005 | Patel |
| 2005/0165826 A1 | 7/2005 | Ho et al. |
| 2005/0166209 A1 | 7/2005 | Merrick et al. |
| 2005/0171970 A1 | 8/2005 | Ozzie et al. |
| 2005/0203944 A1 | 9/2005 | Dinh et al. |
| 2005/0210414 A1 | 9/2005 | Angiulo et al. |
| 2006/0265478 A1 | 11/2006 | Chiang et al. |
| 2007/0083524 A1 | 4/2007 | Fung et al. |
| 2007/0094283 A1 | 4/2007 | Fung et al. |

OTHER PUBLICATIONS

"Component of the Week: XMI Toolkit", Jun. 1, 2001, http://www.ibm.com/developerworks/library/co-cow21.html, 1 page.

"Application Development/Enablement," http://www-3.ibm.com/software/data/ims/presentations/five/trends2003/HTML/indexp51 . . . , printed Nov. 11, 2003, 3 pages, Lotus® Freelance Graphics®.

Weber, O. W., "Correlate IMSADF Secondary Transaction MFS Generation with the Generation of the Output Format Rule," IBM Technical Disclosure Bulletin, vol. 27, No. 1B, Jun. 1984, 3 pages.

Sanders, C. J., "Remote Execution of IMS Transactions for OS/2," IBM Technical Disclosure Bulletin, vol. 34, No. 7B, Dec. 1991, 2 pages.

Ho, Shyh-Mei F., "Connecting to IMS Using XML, Soap and Web Services," IMS Technical Conference, Koenigswinter, Germany, Oct. 15-17, 2002, 39 pages.

"XML and IMS for Transparent Application Integration", Excerpt from http://www-3.ibm.com/software/data/ims/...ntations/two/imsv7enh/HTML/indexp50.htm, © copyright IBM Corporation, 2002, printed Jan. 16, 2003, 2 pages, Lotus® Freelance Graphics®.

"Web Services—The Next Step In The Evolution of the Web", Excerpt from http://www-3.ibm.com/software/data/ims/...ntations/two/imsv7enh/HTML/indexp51.htm, © copyright IBM Corporation, 2002, printed Jan. 16, 2003, 1 page, Lotus® Freelance Graphics®.

"What's Next in IMS Providing Integrated e-business Solutions: IMS Version 8", Excerpt from http://www-3.ibm.com/software/data/ims/...ntations/two/imsv7enh/HTML/indexp53.htm, © copyright IBM Corporation, 2002, printed Jan. 16, 2003, Lotus® Freelance Graphics®.

"IMS Follow-on Ideal for e-business", Excerpt from http://www-3.ibm.com/software/data/ims/...ntations/two/imsv7enh/HTML/indexp54.htm, © copyright IBM Corporation, 2002, printed Jan. 16, 2003, 2 pages, Lotus® Freelance Graphics®.

"IMS Information", Excerpt from http://www-3.ibm.com/software/data/ims/...ntations/two/imsv7enh/HTML/indexp55.htm, © copyright IBM Corporation, 2002, printed Jan. 16, 2003, 1 page, Lotus® Freelance Graphics®.

Microsoft Press Computer Dictionary, 1997, p. 371, Third Edition, Microsoft Press.

"NetDynamics PAC for IMS User's Guide", Precise Connectivity Solutions, 1998, 96 pages, Precise Limited.

Long, Rick, et al. "IMS Primer", www.redbooks.ibm.com, Jan. 2000, pp. 147-152 and 157-172, First Edition, IBM International Technical Support Organization.

"Web Services Description Language (WSDL) 1.1", Mar. 15, 2001, W3C, 46 pages.

"Extensible Markup Language (XML) 1.0 (Second Edition)" Oct. 6, 2000, W3C, 59 pages.

"IMS Connect Guide and Reference Version 1", Oct. 2000, 277 pages, First Edition, IBM Corporation.

"UML™ for EAI UML™ Profile and Interchange Models for Enterprise Application Integration (EAI)", Sep. 17, 2001, 254 pages, Object Management Group.

Cover, Robin, Editor, Web Services for Interactive Applications (WSIA). [Web Services Component Model (WSCM)], http://xml.coverpages.org/wscm.html, Jan. 21, 2002, printed Oct. 31, 2007, 4 pages.

Jäntti, Jouko, "Solutions for IMS Connectivity", Abridged from "IMS Connectivity in an On Demand Environment: A Practical Guide to IMS Connectivity" Redbook (SG246794), 15 pages, (referred to as "http://www-1.ibm.com/support/docview.wss?uid=swg27009024&aid=1, Feb. 2006" in U.S. Appl. No. 10/668,740).

"IMS Connect Guide and Reference Version 1 Release 2", Oct. 2002, 334 pages, Third Edition, IBM Corporation, (referred to as "http://publibfp.boulder.ibm.com/epubs/pdf/hwsuga11.pdf" in U.S. Appl. No. 10/668,740).

"MFS XML Utility Version 9.3.0 User's Guide and Reference", 57 pages, IBM Corporation, (referred to as "ftp://ftp.software.ibm.com/software/data/ims/toolkit/mfswebsupport/mfsxml-v3.pdf, 2003" in U.S. Appl. No. 10/668,740).

Blackman, Ken, "IMS eBusiness Update", IMS V8 Roadshow, 11 pages, IBM Corporation, (referred to as "http://www-306.ibm.com/software/data/ims/shelf/presentations/oneday/IMSeBusinessUpdate2003.pdf, 2003" in U.S. Appl. No. 10/668,740).

"XML and IMS for Transparent Application Integration," www-3.ibm.com/software/data/ims/presentations/four/vienna/html/indexp20.htm, printed Jun. 11, 2003, 2 pages, Lotus® Freelance Graphics®.

Starkey, M., "XML-Based Templates For Generating Artifacts From Java-Based Models," Research Disclosure, Dec. 1998, pp. 1678-1680.

"IMS Connector For Java, User's Guide and Reference", IBM VisualAge® for Java™, Version 3.5, 9 pages, IBM.

Royappa, Andrew V., "Implementing Catalog Clearinghouses with XML and XSL", ACM, San Antonio, TX, 1999, pp. 616-623.

"Sterling Commerce Announces Availability of First Data Transformation Engine to Support Both XML and Traditional EDI Standards", PR Newswire, New York, May 12, 1999, 3 pages.

"XMLSolutions Delivers XML-based Prototype for Envera Marketplace", PR Newswire, New York, Apr. 10, 2000, 3 pages.

Suzuki, Junichi, et al., "Managing the software design documents with XML", ACM, Quebec, Canada, 1998, 10 pages.

Stieren, Carl, "SST: Using Single-sourcing, SGML, and Teamwork for Documentation", ACM, New Orleans, LA, 1999, pp. 45-52.

Dymetman, Marc, et al., "XML and Multilingual Document Authoring: Convergent Trends", ACM, Saarbrüken, Germany, 2000, 7 pages.

Hofstetter, Fred T., "The Future's Future: Implications of Emerging Technology for Special Education Program Planning", vol. 16, 18 pages, (referred to as "Journal of Special Education Technology, Fall 2001" in U.S. Appl. No. 10/244,711).

Diaz, Luis Martin, et al., "Inter-Organizational Document Exchange—Facing the Conversion Problem with XML", ACM, SAC, Madrid, Spain, 2002, 5 pages.

Arndt, T., et al., "An XML-Based Approach to Multimedia Software Engineering for Distance Learning", ACM, Seke, Ischia, Italy, Jul. 15-19, 2002, 8 pages, vol. 27.

Glushko, Robert, et al., "An XML Framework for Agent-Based E-Commerce", Communications of the ACM, Mar. 1999, pp. 106-114, vol. 42, No. 3.

"Leveraging IMS Applications and Data", Excerpt from Leveraging IMS2 found at http://www-ibm.com/software/data/ims/...ntations/two/imsv7enh/HTML/indexp52.htm, © copyright IBM Corporation, 2002, printed Jan. 16, 2003, 2 pages, Lotus® Freelance Graphics®.

"HostBridge and WebSphere: Integrating CICS with IBM's Application Server," a HostBridge White Paper, Jul. 23, 2002, pp. 1-34.

"S1215, www.IMS or Websphere Working with IMS," Ken Blackman, 39 pp. (date unknown) pp. 1-39, Jan. 26, 2004.

"Attunity Connect for Mainframe, Native OS/390 Adapters to Data and Legacy," 2003, pp. 1-3 Dec. 31, 2003.

"Learning Management Systems XML and Web Services," Finn Gronbaek, IBM Corporation, copyright 2001, Apr. 20, 2003, pp. 1-29.

* cited by examiner

SYSTEM AND METHOD TO FACILITATE XML ENABLED IMS TRANSACTIONS BETWEEN A REMOTE CLIENT AND AN IMS APPLICATION PROGRAM

FIELD OF THE DISCLOSURE

The present disclosure relates generally to computer software, and more specifically to IMS software.

BACKGROUND

A significant portion of corporate data in the United States and abroad resides on mainframe computers, e.g., S/390 mainframes manufactured by International Business Machines. Much of the information stored on mainframe computers is managed using information management systems (IMS).

Typically, an IMS includes an IMS connect program and an IMS application program that can communicate with each other when a request is submitted to the IMS connect program. Many current IMS customers require access to IMS applications from z/OS and non-z/OS environments using XML. As such, extensible markup language (XML) is becoming a core technology to IMS applications. Thus, there exists a need for XML support in IMS Connect programs.

Accordingly, there is a need for a system and method for facilitating XML enabled IMS transactions.

SUMMARY

A method for facilitating XML enabled IMS transactions includes receiving an XML input request at an IMS connect program and creating an input request byte array from the XML input request within the IMS connect program. Thereafter, the input request byte array is transmitted from the IMS connect program to an IMS application program.

In a particular embodiment, an output response byte array is generated within the IMS application program. The output response byte array is transmitted to the IMS connect program. An XML output response is created from the output response byte array within the IMS connect program, and the XML output response is transmitted to a user computer connected to the IMS connect program.

Moreover, in a particular embodiment, the IMS connect program includes a XML processor, and the method further includes transmitting the XML input request to a queue header within the XML processor. An XML server within the XML processor retrieves an XML input request control block from the queue header. Moreover, an XML adapter routine is invoked within the IMS connect program. The XML input request can be parsed and translated to create an input request byte array. Thereafter, the input request byte array is transmitted to the XML server. The XML server transmits the input request byte array to an IMS application program. Based on the input request byte array, an output response byte array is generated within the IMS application program.

In a particular embodiment, the output response byte array is transmitted to the queue header within the XML processor. The XML server within the XML processor retrieves an output response control block from the queue header. Further, an XML adapter routine is invoked within the IMS connect program and the output response byte array is parsed and translated to create an XML output response. The XML output response is transmitted to the user computer.

In another aspect of the illustrative embodiment of the present invention, a system for facilitating XML enabled IMS transactions includes a mainframe server. An IMS connect program and an IMS application program reside in the mainframe server. The IMS application program communicates with the IMS connect program. In this embodiment of the present invention, the IMS connect program includes logic for receiving at least one XML input request. The IMS connect program creates an input request byte array from the XML input request and transmits the input request byte array to an IMS application program.

In yet another aspect a computer program device is disclosed for facilitating XML enabled IMS transactions between a user computer and an IMS application program. The computer program device includes logic for receiving an XML input request from the user computer. The computer program device creates an input request byte array from the XML input request and transmits the input request byte array to an IMS application program.

DESCRIPTION OF THE DRAWINGS

Figure 1:
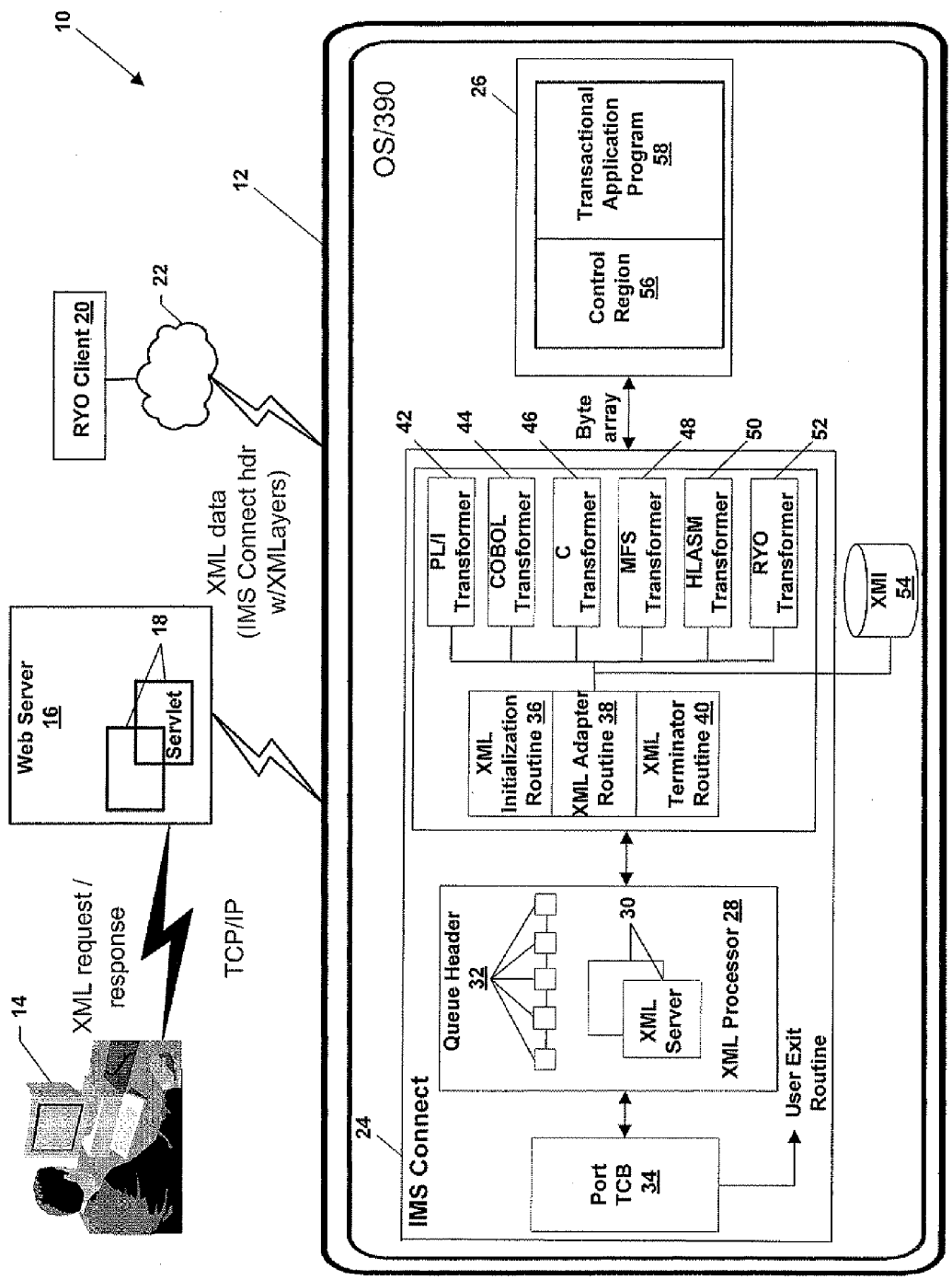
FIG. 1 is a block diagram of a system for facilitating XML enabled IMS transactions.

Referring initially to FIG. 1, an information management system (IMS) is shown and is generally designated 10. As shown, the system 10 includes a mainframe server 12 in which an operating system, e.g., OS/390 or zOS, is installed. At least one user computer 14 can access the mainframe server 12 via a web server 16. As shown, plural servlets 18, e.g., Java programs, reside on the web server 16. Additionally, one or more roll-your-own (RYO) clients 20 can access the mainframe server 12 via a transmission control protocol/internet protocol (TCP/IP) network 22. It is to be understood that RYO clients 20 are those clients that provide their own software to interact with the mainframe sewer 12.

FIG. 1 further shows that the mainframe server 12 includes an IMS connect program 24 that communicates with an IMS application program 26. It is to be understood that the IMS connect program 24 provides communication linkages between TCP/IP clients, e.g., via one or more user computers 14, and the IMS application program 26. The IMS connect program 24 can also provide communication linkages between one or more RYO clients 20 and the IMS application program 26. During operation, as described in detail below, the IMS connect program 24 communicates with the IMS application program 26 via a byte array.

As shown in FIG. 1, the IMS connect program 24 includes an extensible markup language (XML) processor 28 that includes plural XML servers 30 and plural queue headers 32. The XML processor 28 communicates with a port task control block (TCB) 34 and with several plugins. In an alternative embodiment, the plugins can include an XML initialization routine 36, an XML adapter routine 38, and an XML terminator routine 40. As shown, the XML adapter routine 38 can communicate with one or more data transformers. In the non-limiting exemplary embodiment shown in FIG. 1, the XML adapter routine 38 can communicate with a PL/I transformer 42, a Cobol transformer 44, a C transformer 46, a message format services (MFS) transformer 48, a High Level Assembler (HLASM) transformer 50, and a RYO transformer 52. FIG. 1 also shows that the transformers 42-52 can communicate with an XML metadata interchange (XMI) repository 54.

Referring still to FIG. 1, the IMS application program 26 includes a control region 56 that receives a byte array from the IMS connect program 24. The IMS application program 26 also includes a transactional application program 58. It is to be understood that the transactional application program 58 includes a message processing program (MPP) region, an interactive fast path (IFP) region, and a batch message processing (BMP) region. Further, it is to be understood that the IMS application program 26 is the area in the mainframe server 12 in which user queries or requests are processed in order to determine the corresponding outputs that can be returned via the IMS connect program 24. For example, a user can submit a query or request regarding a bank account, e.g., an online bank statement, in XML to the IMS connect program 24. The IMS connect program 24 can process that request, as described in detail below, and then, submit a processed request to the IMS application program 26, e.g., in a byte array. Further, the IMS application program 26 receives the request, determines the appropriate response to the request, and generates an output response that is returned to the IMS connect program 24, e.g., in a byte array. The IMS connect program 24 can then process the output response, as described in detail below, to create an XML response that, in turn, can be returned to the user computer 14 from which the initial response was received.

It is to be understood that in the system 10 described above, the logic of the present disclosure can be contained on a data storage device with a computer readable medium, such as a computer diskette. Or, the instructions may be stored on a magnetic tape, hard disk drive, electronic read-only memory (ROM), optical storage device, or other appropriate data storage device or transmitting device thereby making a computer program product, i.e., an article of manufacture. In an illustrative embodiment, the computer-executable instructions may be lines of C++ compatible code.

The flow charts herein illustrate the structure of the logic as embodied in computer program software. Those skilled in the art will appreciate that the flow charts illustrate the structures of computer program code elements including logic circuits on an integrated circuit. An implementation includes a machine component that renders the program elements in a form that instructs a digital processing apparatus (e.g., a computer) to perform a sequence of function steps corresponding to those shown.

Figure 2:
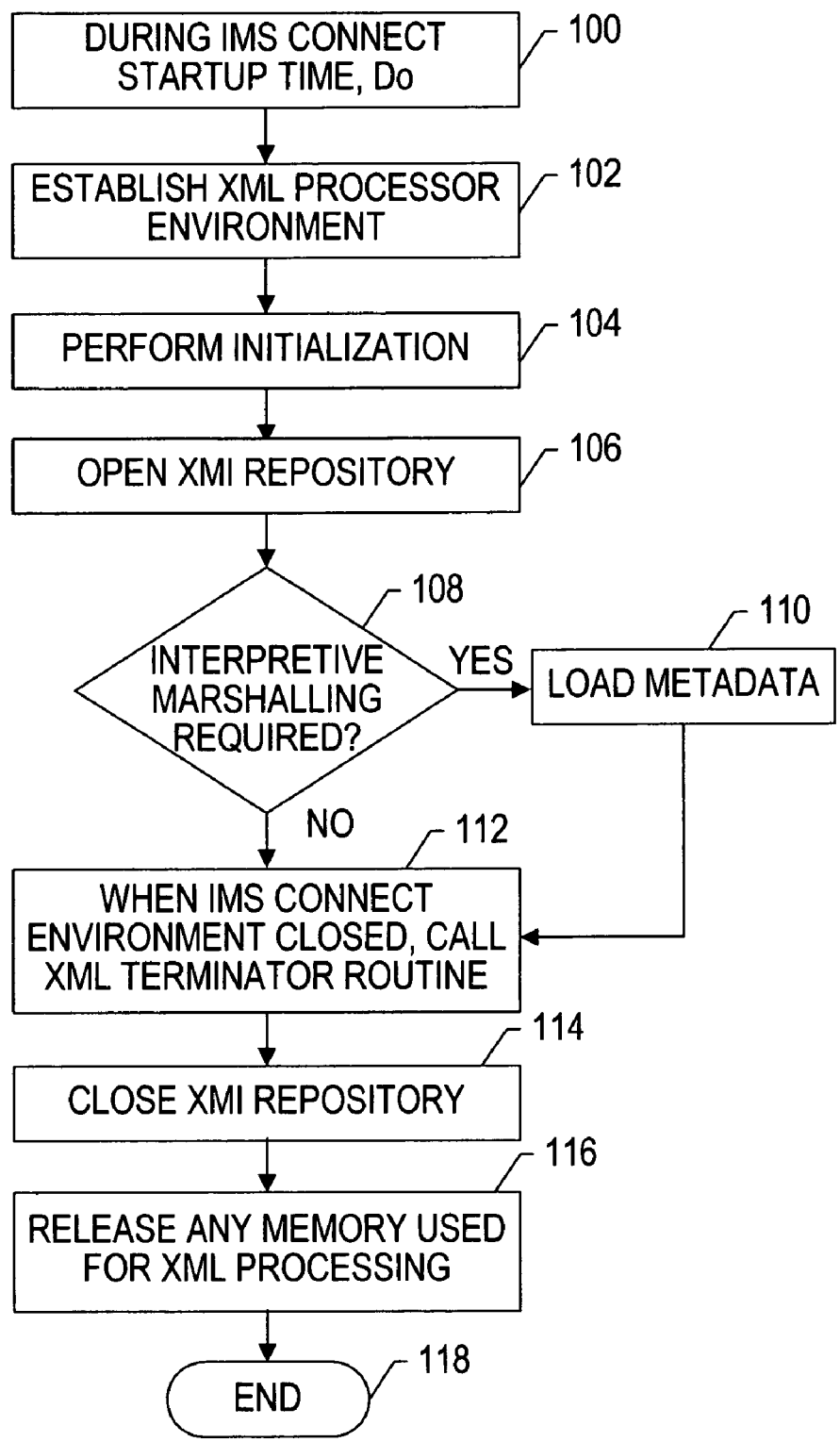
FIG. 2 is a flow chart to illustrate operating logic of the system of FIG. 1.

Referring now to FIG. 2, a particular embodiment of the overall operating logic is shown and commences at block 100 with a do loop wherein during IMS connect startup time, the succeeding steps are performed. At block 102, an XML processor environment is established. Next, at block 104, initialization is performed. Moving to block 106, the XMI repository 54 (FIG. 1) is opened. Thereafter, at decision diamond 108, it is determined whether interpretive marshalling is required. If so, the logic proceeds to block 110 and metadata is loaded. The logic then continues to block 112 and when the IMS connect environment is closed, the XML terminator routine 40 (FIG. 1) is called. Returning to decision diamond 108, if interpretive marshalling is not required, the logic proceeds directly to block 112. Then, at block 114, the XMI repository 54 (FIG. 1) is closed. Moving to block 116, memory used for XML processing is released. Thereafter, logic ends at state 118.

Figure 3:
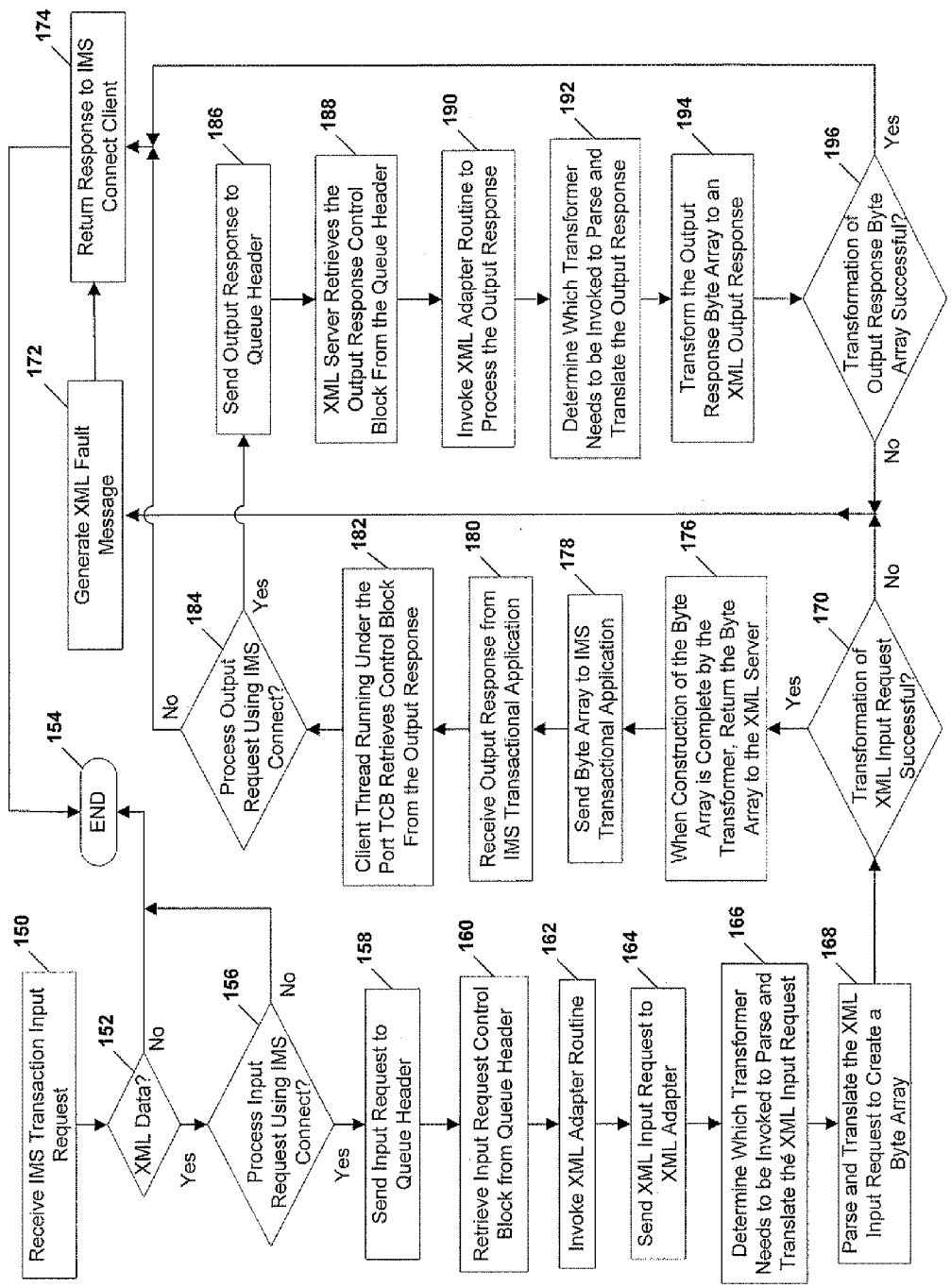
FIG. 3 is a flow chart to illustrate a method for facilitating XML enabled IMS transactions.

Referring now to FIG. 3, a method for facilitating XML enabled IMS transactions is shown. At block 150, an IMS transaction input request is received at the mainframe server 12 (FIG. 1), e.g., at the IMS connect program 24 (FIG. 1). Next, at decision diamond 152, it is determined whether the IMS transaction input request includes XML data. If not, the logic ends at state 154. If the IMS transaction input request does include XML data, the logic moves to decision diamond 156 and it is determined whether the input request needs to be processed using the IMS connect program 24 (FIG. 1). If not, the logic ends at state 154. On the other hand, if the input request must be processed using the IMS connect program 24 (FIG. 1), the logic moves to block 158 and the input request is sent to one of the queue headers 32 (FIG. 1).

Continuing to block 160, one of the XML servers 30 (FIG. 1) within the IMS connect program 24 (FIG. 1), retrieves the input request control block from the queue header 32 (FIG. 1). Thereafter, at block 162, the XML server 30 (FIG. 1) invokes the XML adapter routine 38 (FIG. 1). Proceeding to block 164, the XML input request is sent to the XML adapter routine 38 (FIG. 1). At block 166 it is determined which transformer, e.g., the PL/I transformer 42 (FIG. 1), the COBOL transformer 44 (FIG. 1), the C transformer 46 (FIG. 1), the MFS transformer 48 (FIG. 1), the HLASM transformer 50 (FIG. 1), or the RYO transformer 52 (FIG. 1), needs to be invoked in order to parse and translate the XML input request. Moving to block 168, the XML input request is parsed and transformed to create a byte array. Next, at decision diamond 170, it is determined whether the transformation process undertaken at block 168 is successful. If not, the logic moves to block 172 and an XML fault message is generated. Thereafter, the logic proceeds to block 174 and the XML fault message is returned as a response to the IMS connect client. The logic then ends at state 154.

Returning to decision diamond 170, if the transformation process at block 168 is successful, the logic moves to block 176. At block 176, when the appropriate transformer completes construction of the byte array, the byte array is returned to the XML server 30 (FIG. 1). Proceeding to block 178, the XML server 30 (FIG. 1) sends the byte array to the IMS application program 26 (FIG. 1), e.g., to the transactional application program 58 (FIG. 1) therein.

Still referring to FIG. 3, at block 180, an output response from the IMS application program 26 is received by a client thread running under the Port TCB 34 (FIG. 1). The client thread running under the Port TCB 34 (FIG. 1) retrieves the control block from the output response at block 182. Moving to decision diamond 184, it is determined whether the output response must be processed using the IMS connect program 24 (FIG. 1). If not, the logic proceeds to block 174 and the response is returned as is to the IMS connect client, e.g., to a user computer 14 (FIG. 1). At decision diamond 184, if the output response must be processed using the IMS connect program 24 (FIG. 1), the logic continues to block 186 and the client thread running under the Port TCB 34 (FIG. 1) sends the output response to one of the queue headers 32 (FIG. 1). Thereafter, an XML server 30 (FIG. 1) retrieves the output response control block from the queue header 32 (FIG. 1) at block 188.

Continuing the description of the logic, at block 190, the XML adapter routine 38 (FIG. 1) is invoked to process the output response. At block 192, it is determined which transformer, e.g., the PL/I transformer 42 (FIG. 1), the COBOL transformer 44 (FIG. 1), the C transformer 46 (FIG. 1), the MFS transformer 48 (FIG. 1), the HLASM transformer 50 (FIG. 1), or the RYO transformer 52 (FIG. 1), needs to be invoked to parse and translate the output response. Then, at block 194, the output response byte array is transformed to an XML output response. Moving to decision diamond 196, it is determined whether the transformation process undertaken at block 194 is successful. If not, the logic moves to block 172 and an XML fault message is generated. Thereafter, the logic proceeds to block 174 and the XML fault message is returned as a response to the IMS connect client. The logic then ends at state 154. Returning to decision diamond 196, if the transformation process at block 194 is successful, the logic moves to block 174 where an XML output response is returned to the IMS connect client. The logic then ends at state 154.

With the configuration of structure described above, it is to be appreciated that the system and method described above provides a means for facilitating XML enabled IMS transactions. The present disclosure provides a generic XML processor inside an IMS connect program to facilitate any TCP/IP clients, including WebSphere and non-WebSphere, to send and receive XML documents to and from existing IMS transaction business logic. Translations between XML documents and IMS transaction message data structures occur within the IMS connect program under an XML task to parse and transform XML requests and responses. Further, the generic XML processor within the IMS connect program can provide data translation for both non-formatted and formatted IMS transactional messages in XML. Non-formatted XML messages can be, for example, COBOL, PL/I, C, or Java payload transactional data. Formatted XML messages are MFS-based XML messages. The present system can also allow a third-party provided data transformer to be plugged into the system to facilitate XML parsing and transformation.

While a particular embodiment of a SYSTEM AND METHOD FOR FACILITATING XML ENABLED IMS TRANSACTIONS has been illustrated and described in detail, it is to be understood that the disclosed embodiment of the present invention is representative of the subject matter which is broadly contemplated by the present invention, that the scope of the present invention fully encompasses other embodiments and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A method comprising:

Receiving an input request at an information management system (IMS) connect program from a user computer, wherein the user computer is associated with a client that provides software to access the IMS connect program independent of a web server;

Transmitting the input request to a queue header of the IMS connect program, when the input request is an extensible markup language (XML) input request;

Retrieving an input request control block from the queue header;

Invoking a specified data transformer to parse and translate the input request to create an input request byte array;

Transmitting the input request byte array to an IMS application program;

Receiving an output response byte array from the IMS application program;

Transmitting the output response byte array to the queue header;

Retrieving an output response control block from the queue header;

Invoking the data transformer to parse and translate the output response byte array to create an XML output response; and Transmitting the XML output response to the user computer via a communication path that is independent of the web server.

2. The method of claim 1, further comprising, generating an XML fault message when the translation of the input request or translation of the output response has not been successful.

3. The method of claim 1, further comprising, determining when the input request includes XML data.

* * * * *